N. CHAMBERS, H. A. McCOY, T. G. ANDERSON & C. WEBB.
TRANSMISSION DEVICE FOR MOTOR CYCLES.
APPLICATION FILED NOV. 27, 1912.
1,059,275.
Patented Apr. 15, 1913.
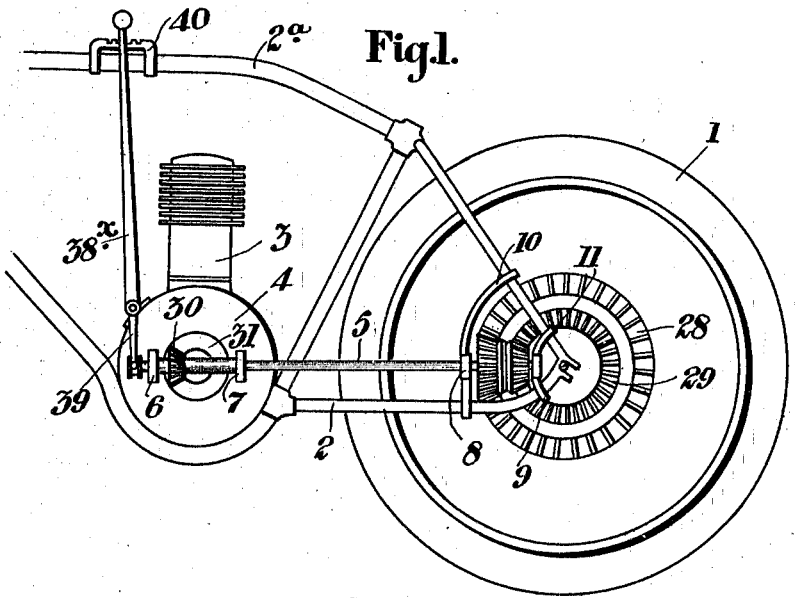
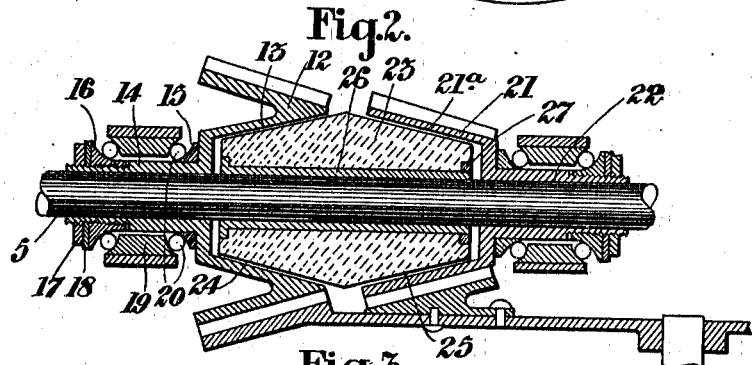
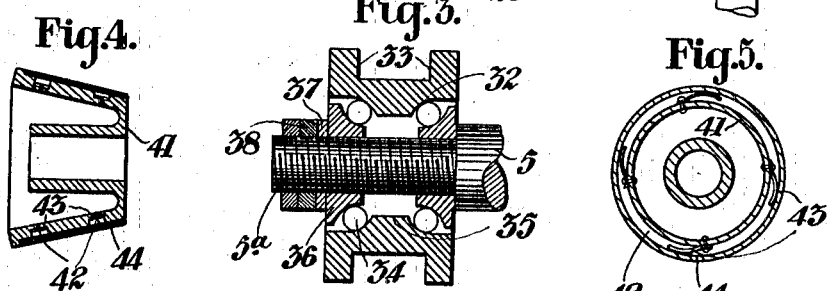
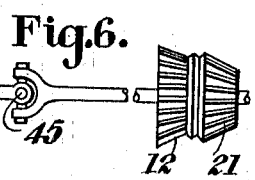

UNITED STATES PATENT OFFICE.

NELSON CHAMBERS, HENRY ALEXANDER McCOY, THOMAS GILBERT ANDERSON, AND CHARLES WEBB, OF HAMILTON, ONTARIO, CANADA.

TRANSMISSION DEVICE FOR MOTOR-CYCLES.

1,059,275.   Specification of Letters Patent.   Patented Apr. 15, 1913.

Application filed November 27, 1912. Serial No. 733,812.

*To all whom it may concern:*

Be it known that we, NELSON CHAMBERS, HENRY ALEXANDER MCCOY, THOMAS GILBERT ANDERSON, and CHARLES WEBB, all of the city of Hamilton, in the county of Wentworth, in the Province of Ontario, Canada, having invented certain new and useful Improvements in Transmission Devices for Motor-Cycles, do hereby declare that the following is a full, clear, and exact description of the same.

Our invention relates to improvements in transmission devices for motor cycles, and the object of the invention is to devise a simple, effective and positive change speed gearing for motor cycles, which can be readily applied thereto; a further object is to construct a change speed gearing in which the gears are always in mesh; a still further object is to devise a change speed gearing, which can be readily removed for repairs.

Our invention consists of a slidable shaft extending horizontally of the frame supported in forward bearings secured to the crank case of the engine, and supported at its rear end in suitable bearings secured to the members of the frame, the bevel pinion having a forwardly extending shank, and rotatably mounted on ball-bearings forward of the rear shaft bearings, the interior of the pinion being of truncated conical shape, a bevel pinion similarly mounted in the rear of the rear shaft bearings and having a truncated conical interior set oppositely to the aforesaid interior of the other pinion, a double opposed truncated bevel pinion, a double opposed truncated conical friction member rigidly secured to the aforesaid shaft, concentric bevel gears secured to the rear wheel and meshing with aforesaid bevel pinions respectively, said pinions being normally independent of the slidable shaft, a bevel pinion suitably secured near the forward end of the slidable shaft and meshing with the bevel gear secured to the crank shaft of the engine, a sleeve having enlarged annular ends and rotatably mounted on ball-bearings on the forward end of the slidable shaft, a control lever pivotally mounted on the crank case of the engine, and having a forked lower end designed to extend around the aforesaid sleeve, the upper end of the lever being provided with a suitable pawl designed to engage a rack secured to the cross bar of the frame all as hereinafter more particularly described and illustrated in the accompanying drawing in which:—

Figure 1 represents an elevation of rear portion of the motor cycle showing our device applied thereto. Fig. 2 is a horizontal section of the change speed gearing. Fig. 3 is a vertical section of the sleeve mounted on the forward end of the slidable shaft. Fig. 4 is a vertical section of an alternative form of friction member. Fig. 5 is a cross section thereof. Fig. 6 is a detail of the change speed gearing and slidable shaft showing the latter provided with a universal joint.

Like characters of reference indicate corresponding parts in the different views.

1 is the rear wheel of the motor cycle.

2 is the frame upon which the wheel is mounted.

3 is the motor cycle engine, 4 is the crank case thereof.

5 is the slidable shaft suitably mounted in forward bearings 6 and 7 at its forward end and in bearings 8 and 9 at its rear end, said rear bearings being suitably secured to the frame 2 by the bracket pieces 10 and 11.

12 is the forward bevel pinion of the change speed gear, said pinion having the truncated conical interior 13 and a forwardly extending shank 14 upon which are mounted removable ball cups 15 and 16. The forward end of the shank is reduced and threaded. The nut 17 is threaded thereon for holding the ball cups in place, said nut being also provided with a lock washer 18. The ball race 19 is inserted into the bearings 8, being removably secured thereto. Balls 20 are introduced into the space between the ball races and ball cups in the manner well known.

21 is the high speed bevel pinion, the pinion 12 being the low speed pinion and said pinion 21 having an oppositely truncated conical interior 21ᵃ to the interior 13 of the pinion 12 and also having a rearwardly extending shank 22, which is mounted on the bearing 9 in the identical manner to that described for the low speed pinion 12.

23 is the double opposed truncated conical friction member having the conical faces 24 and 25 respectively, said friction member being constructed of any suitable material, and being provided with a sleeve 26 having a threaded end upon which a nut 27 is screwed in order that the friction member may be removed when desired. The said member is keyed to the slidable shaft 5 and is designed to slide therewith so that the conical face 24 comes into engagement with the conical interior 13 of the pinion 12 when the shaft is slid forwardly and the conical face 25 comes in engagement with the conical interior 21ª of the high speed pinion 21 when shaft is slid rearwardly.

28 and 29 are concentric bevel gears suitably secured to the rear wheel 1, the gear 28 being the larger and meshing with the aforesaid pinion 12.

30 is the bevel pinion suitably secured to the slidable shaft 5 near the forward end of the same and meshing with the bevel gear 31 secured to the crank shaft of the engine.

32 is the sleeve having enlarged annular ends 33 said sleeve being rotatably mounted on the reduced forward end 5ª of the shaft 5 on ball-bearings 34 which bear against the ball race 35 formed on the interior of the sleeve and against ball cups 36 mounted on the reduced end 5ª, and retained in place by the lock washer 37 and the nuts 38, the latter of which are threaded on the reduced end.

38ˣ is a control lever pivotally connected to the crank case 4 and having a forked lower end designed to surround the sleeve 32. 40 is the rack secured to the cross bar 2ª of the frame, and said lever being designed to engage the teeth of the rack.

In the alternative construction of the friction member shown in Figs. 4 and 5, 41 is a friction member rigidly mounted on the shaft 5 and being of truncated conical shape, 42 are circumferential slots extending around the periphery thereof, and 43 are springs therein. 44 is a conical sleeve of suitable friction material against which the springs bear. It is understood that the conical sleeves engage the respective interiors of the pinions 12 and 21 when this construction is used in place of the friction member shown in Fig. 2.

In Fig. 6 a universal joint 45 is used on the shaft 5.

The operation of the device is as follows:—It is to be assumed that the part 23 is in a neutral position as shown in Fig. 1. When it is desired to throw the gearing into low speed relation, the operator simply pulls back the lever 38ˣ, which moves the slidable shaft 5 forward, and also the friction member 23 which is secured thereto, until the conical surface thereof comes into engagement with the interior 13 of the pinion 12 and the pinion being in mesh with the bevel gear 28, the cycle moves forward on low speed. When sufficient momentum has been attained, and it is desired to change into high speed, it is only necessary to push the lever forward which in turn slides the shaft 5 into the rearward direction and consequently the friction member 23, thus bringing the conical face 25 into engagement with the interior 21ª of the pinion 21, which meshes with the smaller bevel gear 29 thus moving the cycle forward on high speed.

It is to be understood that the lever 38ˣ is adapted to be locked in any position.

As many modifications may be made in the device without departing from the spirit of the invention or the scope of the claims, the form shown is to be taken in an illustrative, and not in a limiting sense. For instance, we do not wish to confine ourselves to the form of particular friction member shown as the members shown in the modification or in fact any suitable member could be used in place thereof.

What we do claim as our invention, and desire to secure by Letters Patent, is—

1. A transmission device for motor cycles comprising concentric high and low speed bevel gears suitably secured to the rear wheel, independent high and low speed pinions meshing respectively with the high and low speed gears, a slidable shaft mounted in suitable bearings and extending through the pinions, a gear on the crank shaft of the engine, a pinion suitably secured to the slidable shaft near its forward end, said pinion meshing with the crank shaft gear, a friction member keyed to the rear end of the shaft, and means for sliding the shaft forwardly and rearwardly for bringing the friction member into engagement with the low and high speed pinions respectively.

2. A transmission device for motor cycles comprising concentric high and low speed bevel gears suitably secured to rear wheel, independent high and low speed pinions, said pinions having oppositely disposed truncated conical shaped interiors, a slidable shaft mounted in suitable bearings and extending through the pinions, a gear on the crank shaft of the engine, a pinion slidably keyed to the slidable shaft, near its forward end, said pinion meshing with the crank shaft gear, a double, opposed truncated conical friction member keyed to the rear end of the shaft and means for sliding the shaft and friction member forwardly and rearwardly for bringing the conical surfaces of the friction member into engagement with the low and high speed pinions respectively.

3. A transmission device for motor cycles comprising concentric high and low speed bevel gears suitably secured to the rear wheel, independent high and low speed pinions said pinions having oppositely disposed truncated conical shaped interiors, a slidable shaft mounted in suitable bearings and extending through the pinions, a gear on the crank shaft of the engine a pinion slidably keyed to the slidable shaft, near its forward end, said pinion meshing with the crank shaft gear, a double, opposed truncated conical friction member keyed to the rear end of the shaft, a sleeve having enlarged annular ends rotatably mounted on the forward end of the slidable shaft, and a pivoted control lever having a forked lower end adapted to extend around the aforesaid sleeve.

4. In a transmission device for motor cycles, the combination with the slidable shaft and rear bearings, of high and low speed pinions having hollow interiors and shanks with threaded outer ends extending through the bearings, removable ball cups mounted on the shanks, balls, ball races removably inserted within the bearings and secured thereto, a friction member keyed on the slidable shaft and nuts threaded in the shanks for holding the pinions in place.

5. In a transmission device for motor cycles, the combination with the slidable shaft and rear bearings, of high and low speed pinions, having hollow interiors, of truncated conical shape, the conical interior of the high speed pinion being reversed to the conical interior of the low speed pinion, and shanks with threaded outer ends extending through the bearings, removable ball cups mounted on the shanks, balls, ball races removably inserted within the bearings and secured thereto, a friction member keyed to the slidable shaft and nuts threaded on the shanks for holding the pinions in place.

6. In a transmission device for motor cycles, the combination with the slidable shaft, of a sleeve having enlarged annular ends, and ball races formed in the interior thereof, balls, ball cups mounted on the shaft and nuts threaded on the end of the shaft for holding the sleeve on the same.

In witness whereof we have hereunto set our hands in the presence of two witnesses.

NELSON CHAMBERS.
HENRY ALEXANDER McCOY.
THOMAS GILBERT ANDERSON.
CHARLES WEBB.

Witnesses:
MURIEL BRAVIN,
RICHARD BUTLER.

Copies of this patent may be obtained for five cents each, by addressing the "Commissioner of Patents, Washington, D. C."